(12) United States Patent
Kim

(10) Patent No.: US 11,618,497 B2
(45) Date of Patent: Apr. 4, 2023

(54) STEER-BY-WIRE SYSTEM FOR VEHICLE AND METHOD OF CONTROLLING THE SAME

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 240 days.

(21) Appl. No.: 16/892,051

(22) Filed: Jun. 3, 2020

(65) Prior Publication Data
US 2020/0391789 A1 Dec. 17, 2020

(30) Foreign Application Priority Data

Jun. 11, 2019 (KR) .................. 10-2019-0068609

(51) Int. Cl.
| | | |
|---|---|---|
| B62D 5/04 | (2006.01) | |
| B62D 6/02 | (2006.01) | |
| B62D 6/00 | (2006.01) | |
| G05D 1/02 | (2020.01) | |

(52) U.S. Cl.
CPC ......... B62D 5/0463 (2013.01); B62D 5/0421 (2013.01); B62D 6/002 (2013.01); B62D 6/02 (2013.01); *G05D 1/021* (2013.01)

(58) Field of Classification Search
CPC .... B62D 5/0463; B62D 5/0421; B62D 6/002; B62D 6/02; B62D 6/008; B62D 5/006; B62D 3/12; B62D 6/007; B62D 6/10; G05D 1/021; B60W 10/20; B60W 2510/202; B60Y 2400/303; B60Y 2400/307
USPC ......................................................... 180/446
See application file for complete search history.

(56) References Cited

U.S. PATENT DOCUMENTS

| | | | | |
|---|---|---|---|---|
| 2012/0111658 A1* | 5/2012 | Hori | ........................ | B62D 6/008 |
| | | | | 180/446 |
| 2018/0015945 A1* | 1/2018 | Kim | ........................ | B62D 6/08 |
| 2019/0367084 A1* | 12/2019 | Hong | ..................... | B62D 6/008 |

(Continued)

FOREIGN PATENT DOCUMENTS

| | | |
|---|---|---|
| JP | 2010-149650 A | 7/2010 |
| KR | 10-2005-0018114 A | 2/2005 |

(Continued)

*Primary Examiner* — Scott A Reinbold
(74) *Attorney, Agent, or Firm* — NSIP Law

(57) ABSTRACT

The present invention relates to a steer-by-wire system for a vehicle, and the system may include a reaction motor generating reaction torque based on the turning of a steering wheel, a steering motor implementing a steering manipulation, a motor location detector measuring a current steering angle by detecting a rotation location of the steering motor, a location controller calculating a target steering angle by applying the amount of a location control error to a vehicle speed, command steering angle and current steering angle, a steering controller driving the steering motor based on the target steering angle, and a reaction controller generating the reaction torque according to a driver's steering state based on the vehicle speed and a steering angular velocity, compensating for the reaction torque based on the amount of the location control error, and driving the reaction motor based on the final reaction torque.

14 Claims, 6 Drawing Sheets

(56) References Cited

U.S. PATENT DOCUMENTS

2020/0223475 A1* 7/2020 Tamaizumi .......... B62D 5/0475
2020/0307674 A1* 10/2020 Morino ................ B62D 5/0463

FOREIGN PATENT DOCUMENTS

KR    10-2017-0109722 A    10/2017
KR    10-2018-0007393 A    1/2018

* cited by examiner

STEER-BY-WIRE SYSTEM FOR VEHICLE AND METHOD OF CONTROLLING THE SAME

CROSS-REFERENCE TO RELATED APPLICATION

This application claims priority from and the benefit of Korean Patent Application No. 10-2019-0068609, filed on Jun. 11, 2019, which is hereby incorporated by reference for all purposes as if set forth herein.

BACKGROUND

Field

Exemplary embodiments of the present disclosure relate to a steer-by-wire (SBW) system for a vehicle and a method of controlling the same, and more particularly, to an SBW system for a vehicle, which compensates for reaction torque based on the amount of a location control error of a steering motor so that the reaction torque can be generated without a sense of difference and a driver can have a road feel, when control rights are transferred based on a steering intention of the driver upon autonomous driving in an SBW system using an SBW method of driving the steering motor, coupled to a rack, to perform a steering operation and generating the reaction torque based on a vehicle speed and a steering angle, and a method of controlling the same.

Discussion of the Background

In general, power steering of a vehicle is related to a steering apparatus based on motive power, and functions to help a steering wheel manipulation of a driver. A method using oil pressure is basically used for such power steering. Recently, the use of a motor-driven power steering (MDPS) system, that is, a method using the force of a motor, is increasing. The reason for this is that the MDPS system has advantages in that it has small weight, occupies a small space, and does not require an oil change compared to the existing oil pressure type power steering system.

Such an MDPS system is configured to include a torque sensor for generating an electric signal proportional to steering torque by detecting the steering torque generated by the turning of a steering wheel, an electronic control unit (ECU) for generating a motor driving signal by receiving the electric signal from the torque sensor, and a motor for generating auxiliary torque based on the motor driving signal generated by the ECU. Accordingly, the auxiliary torque generated by the motor is transmitted to a rack, a pinion gear or a steering column to assist steering torque of a driver.

An active front steering (AFS) or variable gear ratio (VGR) system that enables quicker or more precise steering by changing a ratio of steering input of a driver versus the output angle of a wheel, that is, a steering gear ratio, may be applied to a vehicle on which the MDPS system has been mounted.

In the AFS system, a steering gear ratio variable apparatus is provided between the steering wheel and a steering actuator. The steering gear ratio variable apparatus changes the steering gear ratio by receiving a steering angle of the steering wheel and outputting a changed rotation angle to the steering actuator. In general, the AFS system changes the steering gear ratio based on a vehicle speed. Accordingly, the AFS system can obtain a quick steering characteristic by setting a high steering gear ratio at a low speed, and enables a stable steering manipulation due to reduced steering sensitivity by setting a low steering gear ratio at a high speed.

The VGR system changes the steering gear ratio through the mechanical processing of the rack for converting a rotary motion of a pinion at a steering column end into a rectilinear motion, and changes the steering gear ratio by changing the displacement of the rack based on a steering angle. In such a VGR system, the steering gear ratio varies depending on a steering angle. Accordingly, the VGR system can obtain a finer steering characteristic by setting a low steering gear ratio at a small steering angle, and a quicker steering characteristic by setting a high steering gear ratio at a great steering angle.

An SBW system is recently developed and applied in which mechanical connection devices, such as a steering column or universal joint and a pinion shaft between a steering wheel and a wheel, are removed and the steering of a vehicle is performed by controlling the driving of a motor coupled to a rack based on an electrical signal. Such an SBW system may be configured to include a steering wheel for a steering manipulation of a driver, a reaction motor positioned on one side of the steering wheel to provide reaction torque based on the turning of the steering wheel, a steering motor coupled to a rack to implement a steering manipulation, sensors for detecting a steering angle, a vehicle speed and torque of the steering wheel, and an ECU for driving the steering motor and the reaction motor in response to an electric signal received from the sensor.

Such an SBW system has advantages in that it can reduce damage to a driver, attributable to a mechanical part when a vehicle collides, because a mechanical connection is not present, can reduce weight of the vehicle by reducing a mechanical connection part, can reduce unnecessary energy consumption upon steering operation, and can achieve ideal steering performance through ECU programming. Accordingly, the use of the SBW system tends to gradually increase.

The background technology of the present disclosure is disclosed in Korean Patent Application Laid-Open No. 10-2018-0007393 (Jan. 23, 2018 entitled "APPARATUS FOR CONTROLLING STEERING IN STEER-BY-WIRE SYSTEM AND METHOD THEREOF").

SUMMARY

In such an SBW system, however, it is impossible for a driver to have a road feel physically transferred to a steering wheel by the wheel of a vehicle because reaction control and steering control are performed by a wire in the state in which a mechanical connection part has been deleted.

Accordingly, the SBW system may provide a heavy feel to the driver upon steering through the reaction control, but has a problem in that it inevitably provides a somewhat artificial steering feel rather than a natural steering feel because the SBW system cannot provide a steering feel based on a road surface or a behavior of the vehicle.

Furthermore, in an autonomous vehicle to which the SBW system has been applied, in an autonomous driving mode, reaction control is not performed on a steering wheel because the wheel and steering wheel of the vehicle are not physically coupled. However, the autonomous vehicle has problems in that a sense of difference in steering occurs and instant control stability is reduced if reaction control is suddenly performed when control rights are transferred to a driver due to the release of the autonomous driving mode attributable to the steering of the driver in the autonomous driving mode.

Various embodiments are directed to the provision of an SBW system for a vehicle, which compensates for reaction torque based on the amount of a location control error of a steering motor so that the reaction torque can be generated without a sense of difference and a driver can have a road feel, when control rights are transferred based on a steering intention of the driver upon autonomous driving in an SBW system using an SBW method of driving the steering motor, coupled to a rack, to perform a steering operation and generating reaction torque based on a vehicle speed and a steering angle, and a method of controlling the same.

In an embodiment, a steer-by-wire (SBW) system for a vehicle includes a reaction motor positioned on one side of a steering wheel and configured to generate reaction torque based on the turning of the steering wheel, a steering motor coupled to a rack and configured to implement a steering manipulation, a motor location detector configured to measure a current steering angle by detecting a rotation location of the steering motor, a location controller configured to receive a vehicle speed, a command steering angle and the current steering angle and to calculate a target steering angle by applying the amount of a location control error to the location controller, a steering controller configured to drive the steering motor based on the target steering angle output by the location controller, and a reaction controller configured to generate the reaction torque based on a steering state of a driver by receiving the vehicle speed and a steering angular velocity, to compensate for the reaction torque based on the amount of the location control error, and to drive the reaction motor based on the final reaction torque.

In an embodiment, the reaction controller includes a reaction torque generator configured to generate the reaction torque based on the vehicle speed and the steering angular velocity, a variable filter unit configured to filter out the amount of the location control error by changing a cutoff frequency of a low frequency filter based on the vehicle speed and the steering angular velocity, and a reaction compensator configured to compensate for the reaction torque based on the amount of the location control error filtered out by the variable filter unit and to output the final reaction torque.

In an embodiment, the variable filter unit is configured to set the cutoff frequency of the low frequency filter low when the vehicle speed and the steering angular velocity are high and to set the cutoff frequency of the low frequency filter high when the vehicle speed and the steering angular velocity are low.

In an embodiment, the variable filter unit is configured to set the cutoff frequency of the low frequency filter based on a two-dimensional map using the vehicle speed and the steering angular velocity.

In an embodiment, the reaction controller includes a reaction torque generator configured to generate the reaction torque based on the vehicle speed, the steering angular velocity and the amount of the location control error, a steering mode determination unit configured to determine a driver steering mode based on the amount of the location control error, a weight setting unit configured to set a mode change weight based on a result of the determination by the steering mode determination unit, and an output unit configured to output the final reaction torque by applying, to the reaction torque, the mode change weight set by the weight setting unit.

In an embodiment, the steering mode determination unit is configured to determine a steering mode as the driver steering mode when the amount of the location control error is maintained at a set value or more for a set time or more.

In an embodiment, the weight setting unit is configured to set a maximum mode change weight in an autonomous driving mode and to set a minimum mode change weight in the driver steering mode.

In an embodiment, the weight setting unit is configured to change and set a slope of the mode change weight based on the amount of the location control error or the steering angular velocity, if the steering mode is determined as the driver steering mode.

In an embodiment, the reaction controller includes a reaction torque generator configured to generate the reaction torque based on the vehicle speed and the steering angular velocity, a variable filter unit configured to filter out the amount of the location control error by changing a cutoff frequency of a low frequency filter based on the vehicle speed and the steering angular velocity, a reaction compensator configured to compensate for the reaction torque based on the amount of the location control error filtered out by the variable filter unit, a steering mode determination unit configured to determine a driver steering mode based on the amount of the location control error, a weight setting unit configured to set a mode change weight based on a result of the determination by the steering mode determination unit, and an output unit configured to output the final reaction torque by applying, to the compensated reaction torque, the mode change weight set by the weight setting unit.

In an embodiment, a method of controlling a steer-by-wire (SBW) system for a vehicle includes receiving, by a location controller, a vehicle speed, a command steering angle and a current steering angle and calculating a target steering angle by applying the amount of a location control error to the location controller, driving, by a steering controller, a steering motor based on the target steering angle, generating, by a reaction controller, reaction torque based on a steering state of a driver by receiving the vehicle speed and a steering angular velocity, and driving, by the reaction controller, a reaction motor based on the final reaction torque obtained by compensating for the generated reaction torque based on the amount of the location control error.

In an embodiment, the driving of the reaction motor includes filtering out, by the reaction controller, the amount of the location control error by changing a cutoff frequency of a low frequency filter based on the vehicle speed and the steering angular velocity and compensating for, by the reaction controller, the reaction torque based on the filtered amount of the location control error and driving the reaction motor.

In an embodiment, the cutoff frequency of the low frequency filter is set low when the vehicle speed and the steering angular velocity are high and is set high when the vehicle speed and the steering angular velocity are low.

In an embodiment, the cutoff frequency of the low frequency filter is set using a two-dimensional map based on the vehicle speed and the steering angular velocity.

In an embodiment, the driving of the reaction motor includes determining, by the reaction controller, a driver steering mode based on the amount of the location control error, setting, by the reaction controller, a mode change weight based on a result of the determination for the driver steering mode, and driving, by the reaction controller, the reaction motor based on the final reaction torque by applying the set mode change weight to the reaction torque.

In an embodiment, the determining of the driver steering mode comprises determining, by the reaction controller, a steering mode as the driver steering mode when the amount of the location control error is maintained at a set value or more for a set time or more.

In an embodiment, the setting of the mode change weight includes setting, by the reaction controller, a maximum mode change weight in an autonomous driving mode and setting, by the reaction controller, a minimum mode change weight in the driver steering mode.

In an embodiment, the setting of the mode change weight comprises changing and setting, by the reaction controller, a slope of the mode change weight based on the amount of the location control error or the steering angular velocity when the steering mode is determined as the driver steering mode.

DETAILED DESCRIPTION OF THE ILLUSTRATED EMBODIMENTS

Figure 1:
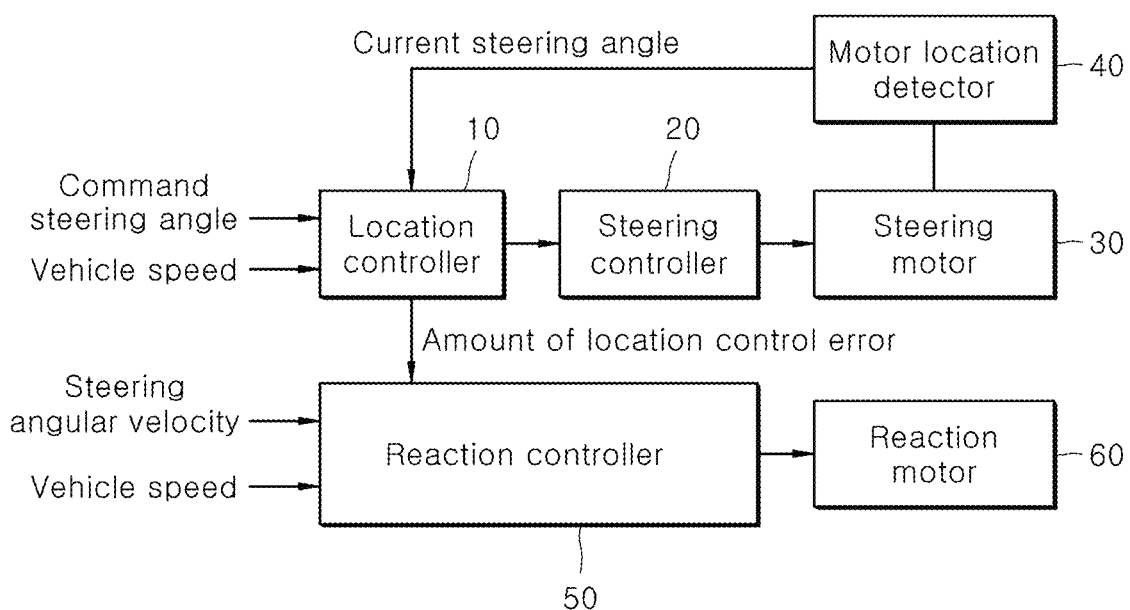
FIG. 1 is a block diagram illustrating a steer-by-wire (SBW) system for a vehicle according to an embodiment of the present disclosure.

Hereinafter, a steer-by-wire (SBW) system for a vehicle and a method of controlling the same will be described with reference to the accompanying drawings through various exemplary embodiments. The thicknesses of lines or the sizes of elements shown in the drawings in a process of describing this specification may have been exaggerated for the clarity and convenience of a description. Terms to be described below have been defined by taking into consideration their functions in the present disclosure, and may be different depending on a user or operator's intention or practice. Accordingly, such terms should be defined based on the overall contents of this specification.

Figure 2:
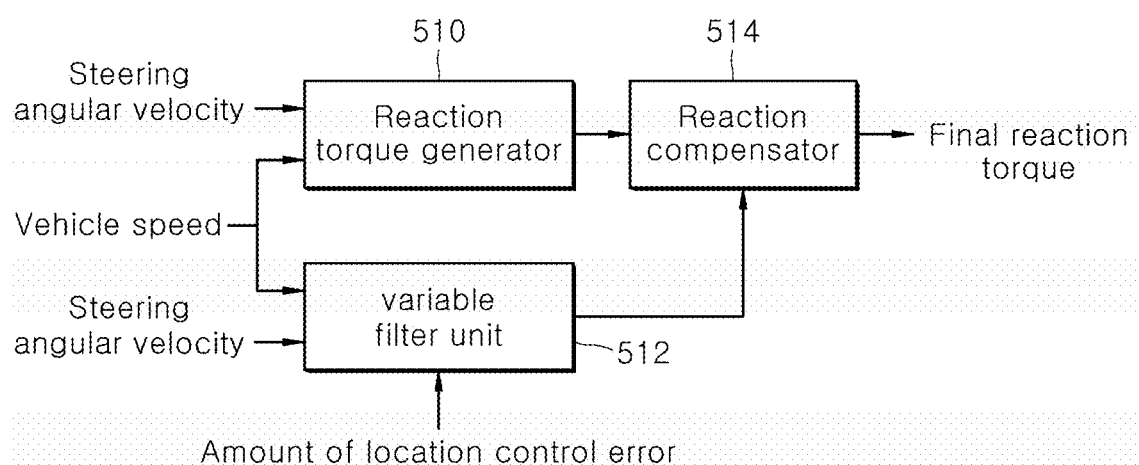
FIG. 2 is a block diagram illustrating a reaction controller of the SBW system for a vehicle according to an embodiment of the present disclosure.

FIG. 1 is a block diagram illustrating an SBW system for a vehicle according to an embodiment of the present disclosure. FIG. 2 is a block diagram illustrating a reaction controller of the SBW system for a vehicle according to an embodiment of the present disclosure.

As illustrated in FIG. 1, the SBW system for a vehicle according to an embodiment of the present disclosure may include a reaction motor 60, a steering motor 30, a motor location detector 40, a location controller 10, a steering controller 20 and a reaction controller 50.

The reaction motor 60 may be positioned on one side of a steering wheel (not illustrated), and may generate reaction torque based on the turning of the steering wheel.

The steering motor 30 may be coupled to a rack (not illustrated), and may implement a steering manipulation by turning a wheel in a desired direction by moving a rack bar.

The motor location detector 40 may provide a current steering angle, measured by detecting the rotation location of the steering motor 30, so that feedback control can be performed by identifying a state of a road surface upon location control.

The location controller 10 may receive a vehicle speed, a command steering angle and a current steering angle, and may calculate a target steering angle by applying the amount of a location control error to the location controller.

In this case, the command steering angle may be a steering angle based on the turning of the steering wheel, when a driver steers the steering wheel in a driver steering mode, and may be a steering angle, output by an autonomous driving controller (not illustrated), in an autonomous driving mode.

Furthermore, the amount of a location control error becomes higher than that in a common state if a driver steers the steering wheel in the state in which the friction force of a road surface is high, an obstacle is present, or a self-alignment force is great in the presence of a vehicle speed or if a driver steers the steering wheel in a situation in which a lateral force is generated due to the wind.

The steering controller 20 drives the steering motor 30 based on the target steering angle, output by the location controller 10 through feedback control, so that steering is performed.

The reaction controller 50 may generate reaction torque based on a steering state of a driver by receiving a vehicle speed and a steering angular velocity, may compensate for the reaction torque based on the amount of a location control error, and may drive the reaction motor 60 based on the final reaction torque, so that the driver can have a steering feel.

In this case, as illustrated in FIG. 2, the reaction controller 50 may include a reaction torque generator 510, a variable filter unit 512 and a reaction compensator 514.

The reaction torque generator 510 may calculate a rack force according to a vehicle model based on a vehicle speed and a steering angular velocity, and may generate reaction torque.

The variable filter unit 512 may filter out the amount of a location control error by changing the cutoff frequency of a low frequency filter based on a vehicle speed and a steering angular velocity.

If the amount of a location control error that varies depending on a load condition of a road surface is applied to reaction torque without any change, a driver may have a sense of difference. Accordingly, the variable filter unit 512 may change the cutoff frequency of the low frequency filter based on a vehicle speed and a steering angular velocity, so that the driver can have a natural steering feel.

For example, when the vehicle speed and the steering angular velocity are high, the variable filter unit 512 may decrease the cutoff frequency of the low frequency filter so that the vibration component of the high frequency component is removed. In contrast, when the vehicle speed and the steering angular velocity are low, the variable filter unit 512 may increase the cutoff frequency of the low frequency filter so that a driver has a natural steering feel while having a feel of a road surface or external force to the maximum.

In the present embodiment, the variable filter unit 512 may set the cutoff frequency of the low frequency filter, so that the driver can have a natural steering feel through tuning using a two-dimensional map based on a vehicle speed and a steering angular velocity.

The reaction compensator 514 may compensate for reaction torque based on the amount of a location control error filtered out by the variable filter unit 512, and may output the final reaction torque.

In this case, the reaction compensator 514 may set the amount of reaction current that needs to be compensated for through tuning, so that a driver can have a natural road feel based on the filtered amount of the location control error, and may output the final reaction torque by incorporating the set amount of reaction current into the reaction torque.

Figure 3:
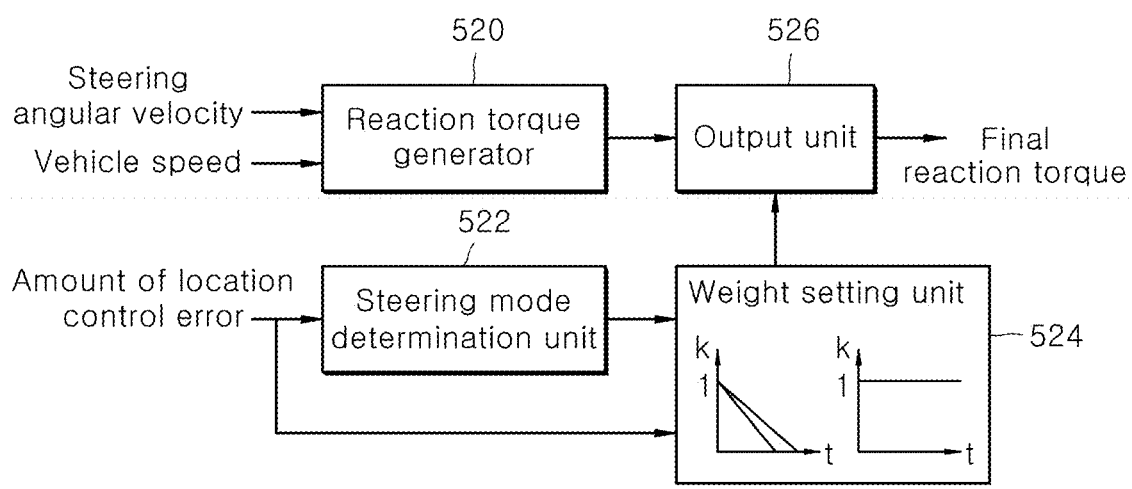
FIG. 3 is a block diagram illustrating a reaction controller of the SBW system for a vehicle according to another embodiment of the present disclosure.

FIG. 3 is a block diagram illustrating the reaction controller 50 of the SBW system for a vehicle according to another embodiment of the present disclosure.

As illustrated in FIG. 3, the reaction controller 50 of the SBW system for a vehicle may include a reaction torque generator 520, a steering mode determination unit 522, a weight setting unit 524 and an output unit 526.

The reaction torque generator 520 may generate reaction torque by which a driver can have a steering feel when turning the steering wheel based on a vehicle speed, a steering angular velocity and the amount of a location control error.

The steering mode determination unit 522 may determine a driver steering mode based on the amount of a location control error calculated in the location controller 10 based on a command steering angle and a current steering angle for feedback control over the steering motor 30.

In this case, the steering mode determination unit 522 may determine the steering mode as the driver steering mode when the amount of the location control error is maintained at a set value or more for a set time or more.

For example, in general, in an autonomous driving mode, the amount of a location control error converges on a very small value because a driver does not steer the steering wheel. However, if a lateral force is applied to a vehicle due to the state of a road surface or a surrounding environment, a given amount of a location control error may occur even in the autonomous driving mode. Furthermore, even when a vehicle runs over a foreign substance, such as a stone, on a road surface or a pothole, the amount of a location control error may instantaneously occur at a given level.

Accordingly, when the amount of a location control error is not maintained for a set time or more, the steering mode determination unit 522 may determine that a temporary change is attributable to a surrounding environment as described above and determine a steering mode as the autonomous driving mode. Only when the amount of the location control error is maintained at a set value or more for a set time or more, the steering mode determination unit 522 may determine that a driver has a steering intention and determine a steering mode as the driver steering mode.

The weight setting unit 524 may set a mode change weight based on a result of a determination by the steering mode determination unit 522.

In this case, the weight setting unit 524 may set a maximum mode change weight in the autonomous driving mode, and may set a minimum mode change weight in the driver steering mode.

That is, the weight setting unit 524 may set the mode change weight so that reaction torque is not output in the autonomous driving mode and generated reaction torque is output to the maximum in the driver steering mode.

Furthermore, if a steering mode is determined as the driver steering mode, the weight setting unit 524 may change and set the slope of the mode change weight based on the amount of the location control error or the steering angular velocity, so that the driver does not have a sense of difference when control rights are transferred from the autonomous driving mode to the driver steering mode. To this end, the weight setting unit 524 may increase the slope of the mode change weight when the amount of the location control error is great through sudden steering, and may decrease the slope of the mode change weight when the amount of the location control error is small through gentle steering.

The output unit 526 may output the final reaction torque by applying, to reaction torque, a mode change weight set by the weight setting unit 524.

For example, the output unit 526 may output the final reaction torque by multiplying (1−mode change weight) and reaction torque.

Accordingly, the output unit 526 does not output reaction torque because a mode change weight is "1" in the autonomous driving mode, and may output reaction torque because a mode change weight is "0" in the driver steering mode.

Figure 4:
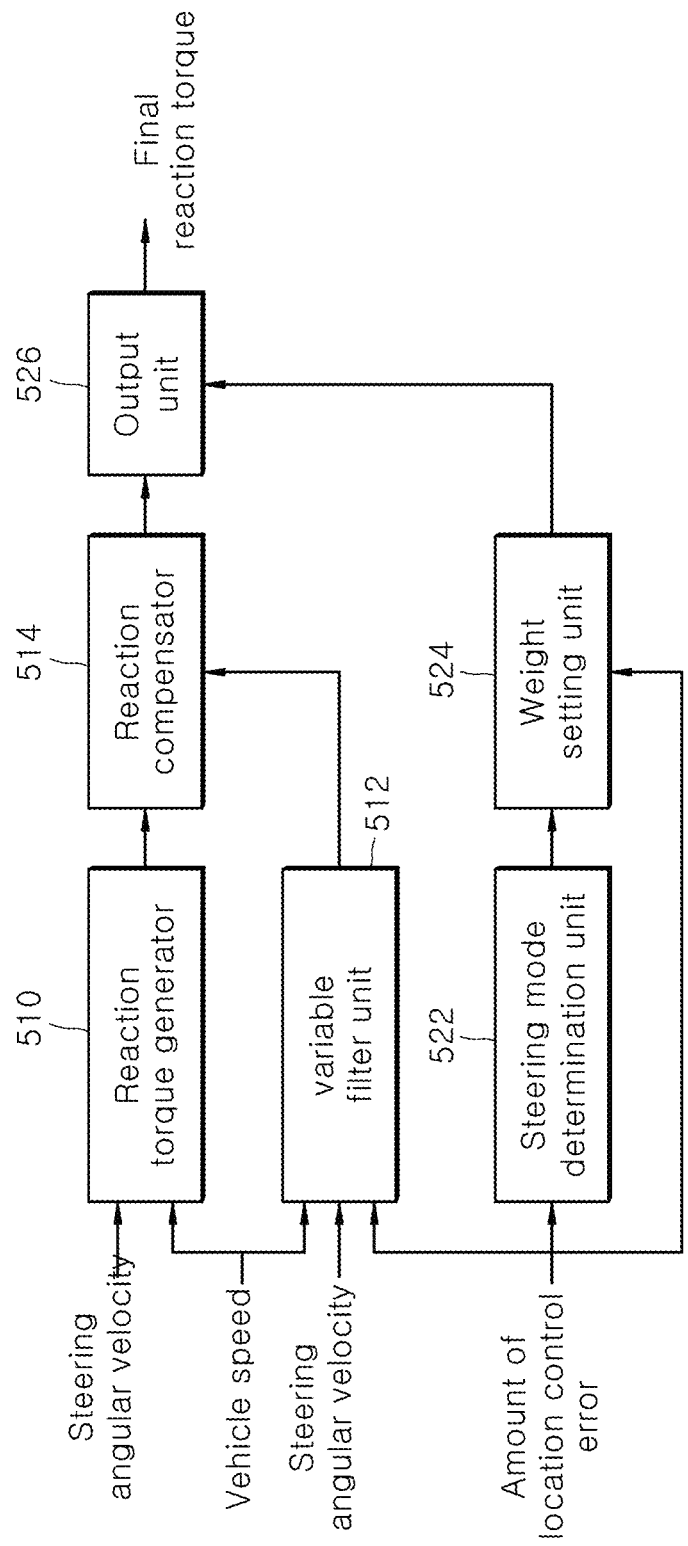
FIG. 4 is a block diagram illustrating a reaction controller of the SBW system for a vehicle according to still another embodiment of the present disclosure.

FIG. 4 is a block diagram illustrating the reaction controller 50 of the SBW system for a vehicle according to still another embodiment of the present disclosure.

As illustrated in FIG. 4, the reaction controller 50 of the SBW system for a vehicle may include a reaction torque generator 510, a variable filter unit 512, a reaction compensator 514, a steering mode determination unit 522, a weight setting unit 524 and an output unit 526.

The reaction controller illustrated in FIG. 4 is a combination of the reaction controllers illustrated in FIGS. 2 and 3, and a detailed description thereof is omitted.

The reaction torque generator 510 may generate reaction torque by calculating a rack force according to a vehicle model based on a vehicle speed and a steering angular velocity.

The variable filter unit 512 may filter out the amount of a location control error by changing the cutoff frequency of a low frequency filter based on a vehicle speed and a steering angular velocity.

If the amount of a location control error that varies depending on a load condition of a road surface is applied to reaction torque without any change, a driver may have a sense of difference. Accordingly, the variable filter unit 512 may change the cutoff frequency of the low frequency filter based on a vehicle speed and a steering angular velocity, so that the driver can have a natural steering feel.

In the present embodiment, the variable filter unit 512 may set the cutoff frequency of the low frequency filter, so that the driver can have a natural steering feel through tuning using a two-dimensional map based on a vehicle speed and a steering angular velocity.

The reaction compensator 514 may compensate for reaction torque based on the amount of a location control error filtered out by the variable filter unit 512.

In this case, the reaction compensator 514 may set the amount of reaction current that needs to be compensated for through tuning so that a driver can have a natural road feel based on the filtered amount of the location control error, and may compensate for the reaction torque by incorporating the set amount of reaction current into the reaction torque.

The steering mode determination unit 522 may determine a steering mode as the driver steering mode based on the amount of a location control error calculated in the location controller 10 based on a command steering angle and a current steering angle for feedback control over the steering motor 30.

In this case, the steering mode determination unit 522 may determine the steering mode as the driver steering mode when the amount of the location control error is maintained at a set value or more for a set time or more.

The weight setting unit 524 may set a mode change weight based on a result of a determination by the steering mode determination unit 522.

In this case, the weight setting unit 524 may set a maximum mode change weight in the autonomous driving mode, and may set a minimum mode change weight in the driver steering mode.

That is, the weight setting unit 524 may set the mode change weight so that reaction torque is not output in the autonomous driving mode and generated reaction torque is output to the maximum in the driver steering mode.

Furthermore, if a steering mode is determined as the driver steering mode, the weight setting unit 524 may change and set the slope of the mode change weight based on the amount of the location control error or the steering angular velocity, so that the driver does not have a sense of difference when control rights are transferred from the autonomous driving mode to the driver steering mode. To this end, the weight setting unit 524 may increase the slope of the mode change weight when the amount of the location control error is great through sudden steering, and may decrease the slope of the mode change weight when the amount of the location control error is small through gentle steering.

The output unit 526 may output the final reaction torque by applying a mode change weight, set by the weight setting unit 524, to reaction torque compensated for by the reaction compensator 514.

As described above, according to the SBW system for a vehicle according to an embodiment of the present disclosure, in an SBW system using an SBW method of driving a steering motor, coupled to a rack, to perform a steering operation and generating reaction torque based on a vehicle speed and a steering angle, when control rights are transferred based on a steering intention of a driver upon autonomous driving, a weight is set and reaction torque is compensated for based on the amount of a location control error. Accordingly, the driver can have a road feel because a sense of difference is removed and the reaction torque is compensated for based on the amount of the location control error of the steering motor.

Figure 5:
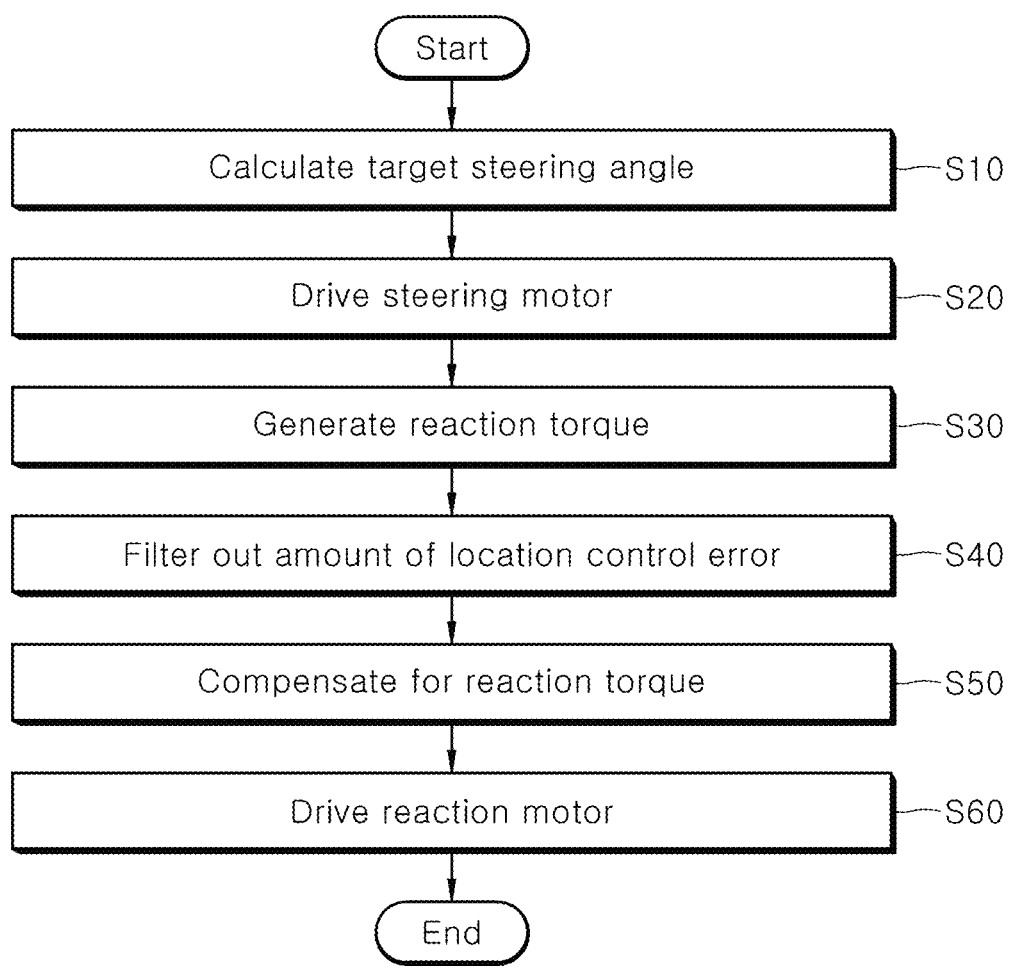
FIG. 5 is a flowchart illustrating a method of controlling an SBW system for a vehicle according to an embodiment of the present disclosure.

FIG. 5 is a flowchart illustrating a method of controlling an SBW system for a vehicle according to an embodiment of the present disclosure.

As illustrated in FIG. 5, in the method of controlling an SBW system for a vehicle according to an embodiment of the present disclosure, first, the location controller 10 receives a vehicle speed, a command steering angle and a current steering angle, and calculates a target steering angle by applying the amount of a location control error to the location controller, at step S10.

In this case, the command steering angle may be a steering angle based on the turning of a steering wheel when a driver steers the steering wheel in the driver steering mode, and may be a steering angle output by an autonomous driving controller (not illustrated) in the autonomous driving mode.

Furthermore, the amount of a location control error becomes higher than that in a common state if a driver steers the steering wheel in the state in which the friction force of a road surface is high, an obstacle is present, or a self-alignment force is great in the presence of a vehicle speed or if a driver steers the steering wheel in a situation in which a lateral force is generated due to the wind.

At step S20, the steering controller 50 drives the steering motor 30 based on the target steering angle, output by the location controller 10 through feedback control at step S10, so that steering is performed.

At step S30, the reaction controller 50 generates reaction torque based on a steering state of the driver, by calculating a rack force according to a vehicle model based on a vehicle speed and a steering angular velocity.

After generating the reaction torque at step S30, the reaction controller 50 filters out the amount of a location control error by changing the cutoff frequency of a low frequency filter based on the vehicle speed and the steering angular velocity at step S40.

If the amount of a location control error that varies depending on a load condition of a road surface is applied to reaction torque without any change, a driver may have a sense of difference. Accordingly, the reaction controller 50 may change the cutoff frequency of the low frequency filter based on a vehicle speed and a steering angular velocity, so that the driver can have a natural steering feel.

For example, when the vehicle speed and the steering angular velocity are high, the reaction controller 50 may decrease the cutoff frequency of the low frequency filter so that the vibration component of the high frequency component is removed. In contrast, when the vehicle speed and the steering angular velocity are low, the reaction controller 50 may increase the cutoff frequency of the low frequency filter so that a driver has a natural steering feel while having a feel of a road surface or external force to the maximum.

In the present embodiment, the reaction controller 50 may set the cutoff frequency of the low frequency filter, so that a driver can have a natural steering feel through tuning using a two-dimensional map based on a vehicle speed and a steering angular velocity.

After filtering out the amount of the location control error based on the vehicle speed and the steering angular velocity at step S40, the reaction controller 50 compensates for the reaction torque based on the filtered amount of the location control error, at step S50.

In this case, the reaction controller 50 may set the amount of reaction current that needs to be compensated for through tuning, so that the driver can have a natural road feel based on the filtered amount of the location control error, and may output the final reaction torque by incorporating the set amount of reaction current into the reaction torque.

At step S50, the reaction controller 50 drives the reaction motor 60 based on the final reaction torque, obtained by compensating for the reaction torque at step S50, so that the driver can have a natural road feel.

Figure 6:
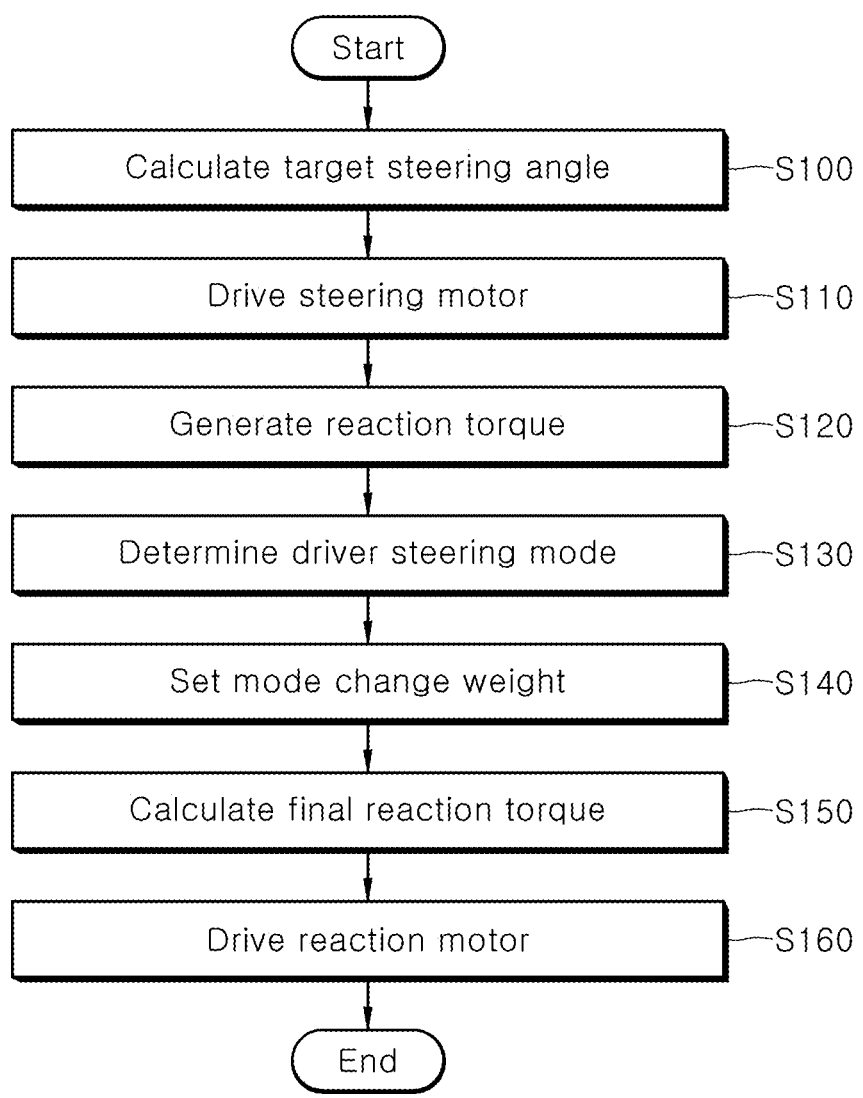
FIG. 6 is a flowchart illustrating a method of controlling an SBW system for a vehicle according to another embodiment of the present disclosure.

FIG. 6 is a flowchart illustrating a method of controlling an SBW system for a vehicle according to another embodiment of the present disclosure.

As illustrated in FIG. 6, in the method of controlling an SBW system for a vehicle according to another embodiment, first, the location controller 10 receives a vehicle speed, a command steering angle and a current steering angle, and calculates a target steering angle by applying the amount of a location control error to the location controller at step S100.

In this case, the command steering angle may be a steering angle based on the turning of a steering wheel when a driver steers the steering wheel in the driver steering mode, and may be a steering angle output by an autonomous driving controller (not illustrated) in the autonomous driving mode.

Furthermore, the amount of a location control error becomes higher than that in a common state if a driver steers the steering wheel in the state in which the friction force of a road surface is high, an obstacle is present, or a self-alignment force is great in the presence of a vehicle speed or if a driver steers the steering wheel in a situation in which a lateral force is generated due to the wind.

At step S110, the steering controller 50 drives the steering motor 30 based on the target steering angle, output by the location controller 10 through feedback control at step S110, so that steering is performed.

At step S120, the reaction controller 50 generates reaction torque based on a steering state of the driver based on a vehicle speed, a steering angular velocity and the amount of a location control error.

After generating the reaction torque at step S120, the reaction controller 50 determines a driver steering mode based on the amount of a location control error calculated in the location controller 10 based on the command steering angle and the current steering angle for feedback control over the steering motor 30, at step S130.

In this case, the reaction controller 50 may determine the steering mode as the driver steering mode when the amount of the location control error is maintained at a set value or more for a set time or more.

For example, in general, in an autonomous driving mode, the amount of a location control error converges on a very small value because a driver does not steer the steering wheel. However, if a lateral force is applied to a vehicle due to the state of a road surface or a surrounding environment, a given amount of a location control error may occur even in the autonomous driving mode. Furthermore, even when a vehicle runs over a foreign substance, such as a stone, on a road surface or a pothole, the amount of a location control error may instantaneously occur at a given level and a bouncing symptom may occur.

Accordingly, when the amount of a location control error is not maintained for a set time or more, the reaction controller 50 may determine that a temporary change is attributable to a surrounding environment as described above and determine a steering mode as the autonomous driving mode. Only when the amount of the location control error is maintained at a set value or more for a set time or more, the reaction controller 50 may determine that a driver has a steering intention and determine a steering mode as the driver steering mode.

After determining the driver steering mode at step S130, the reaction controller 50 sets a mode change weight based on a result of the determination, at step S140.

In this case, the reaction controller 50 may set a maximum mode change weight in the autonomous driving mode, and may set a minimum mode change weight in the driver steering mode.

That is, the reaction controller 50 may set the mode change weight so that reaction torque is not output in the autonomous driving mode and generated reaction torque is output to the maximum in the driver steering mode.

Furthermore, if a steering mode is determined as the driver steering mode, the reaction controller 50 may change and set the slope of the mode change weight based on the amount of the location control error or the steering angular velocity, so that the driver does not have a sense of difference when control rights are transferred from the autonomous driving mode to the driver steering mode. To this end, the reaction controller 50 may increase the slope of the mode change weight when the amount of the location control error is great through sudden steering, and may decrease the slope of the mode change weight when the amount of the location control error is small through gentle steering.

After setting the mode change weight at step S140, the reaction controller 50 calculates the final reaction torque by applying the set mode change weight to the reaction torque, at step S150.

For example, the reaction controller 50 may calculate the final reaction torque by multiplying (1−mode change weight) and the reaction torque.

At step S160, the reaction controller 50 drives the reaction motor 60 based on the final reaction torque calculated at step S150.

Accordingly, reaction torque may not be output because the mode change weight is "1" in the autonomous driving mode, and reaction torque may be output because the mode change weight is "0" in the driver steering mode.

As described above, according to the SBW system for a vehicle and the method of controlling the same according to an aspect of the present disclosure, in an SBW system using an SBW method of driving a steering motor, coupled to a rack, to perform a steering operation and generating reaction torque based on a vehicle speed and a steering angle, when control rights are transferred based on a steering intention of a driver upon autonomous driving, a weight is set and reaction torque is compensated for based on the amount of a location control error. Accordingly, the driver can have a road feel because a sense of difference is removed and the reaction torque is compensated for based on the amount of the location control error of the steering motor.

Furthermore, an implementation described in this specification may be realized as a method or process, apparatus, software program, data stream or signal, for example. Although the present disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant (PDA) and another device which facilitates the communication of information between end-users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steer-by-wire (SBW) system for a vehicle, comprising:
    a motor positioned on one side of a steering wheel and configured to generate reaction torque based on a turning of the steering wheel;
    a steering motor coupled to a rack and configured to implement a steering manipulation;
    a motor location detector configured to measure a current steering angle by detecting a rotation location of the steering motor;
    a location controller configured to determine an amount of a location control error based on a received vehicle speed, a command steering angle, and the current steering angle, and to calculate a target steering angle based on the amount of the location control error;

a steering controller configured to drive the steering motor based on the target steering angle output by the location controller; and
a controller configured to:
generate the reaction torque based on a steering state of a driver by receiving the vehicle speed and a steering angular velocity;
compensate for the reaction torque based on the amount of the location control error, and output a reaction torque; and
drive the motor based on the reaction torque,
wherein the controller is configured to:
generate the reaction torque based on the vehicle speed, the steering angular velocity, and the amount of the location control error;
determine a driver steering mode based on the amount of the location control error;
set a mode change weight based on a result of the determination; and
output the reaction torque by applying, to the reaction torque, the set mode change weight.

2. The SBW system of claim 1, wherein the controller is configured to:
filter out the amount of the location control error by changing a cutoff frequency of a low frequency filter based on the vehicle speed and the steering angular velocity; and
compensate for the reaction torque based on the filtered amount of the location control error and output the reaction torque.

3. The SBW system of claim 2, wherein the controller is configured to:
set the cutoff frequency of the low frequency filter low when the vehicle speed and the steering angular velocity are high, and
set the cutoff frequency of the low frequency filter high when the vehicle speed and the steering angular velocity are low.

4. The SBW system of claim 2, wherein the controller is configured to set the cutoff frequency of the low frequency filter based on a two-dimensional map using the vehicle speed and the steering angular velocity.

5. The SBW system of claim 1, wherein the controller is configured to determine a steering mode as the driver steering mode when the amount of the location control error is maintained at a set value or more for a set time or more.

6. The SBW system of claim 1, wherein the controller is configured to:
set a maximum mode change weight in an autonomous driving mode, and
set a minimum mode change weight in the driver steering mode.

7. The SBW system of claim 1, wherein the controller is configured to change and set a slope of the mode change weight based on the amount of the location control error or the steering angular velocity, if the steering mode is determined as the driver steering mode.

8. A method of controlling a steer-by-wire (SBW) system for a vehicle, the method comprising:
receiving, by a location controller, a vehicle speed, a command steering angle, and a current steering angle;
determining an amount of a location control error based on the received vehicle speed, the command steering angle, and the current steering angle;
calculating a target steering angle based on the amount of the location control error;
driving, by a steering controller, a steering motor based on the target steering angle;
generating, by a controller, reaction torque based on a steering state of a driver by receiving the vehicle speed and a steering angular velocity; and
driving, by the controller, a motor based on the reaction torque obtained by compensating for the generated reaction torque based on the amount of the location control error,
wherein the driving of the motor comprises:
determining, by the controller, a driver steering mode based on the amount of the location control error;
setting, by the controller, a mode change weight based on a result of the determination for the driver steering mode; and
driving, by the controller, the motor based on the final reaction torque by applying the set mode change weight to the reaction torque.

9. The method of claim 8, wherein the driving of the motor comprises:
filtering out, by the controller, the amount of the location control error by changing a cutoff frequency of a low frequency filter based on the vehicle speed and the steering angular velocity; and
compensating for, by the controller, the reaction torque based on the filtered amount of the location control error and driving the motor.

10. The method of claim 9, wherein the cutoff frequency of the low frequency filter is set low when the vehicle speed and the steering angular velocity are high and is set high when the vehicle speed and the steering angular velocity are low.

11. The method of claim 9, wherein the cutoff frequency of the low frequency filter is set using a two-dimensional map based on the vehicle speed and the steering angular velocity.

12. The method of claim 8, wherein the determining of the driver steering mode comprises determining, by the controller, a steering mode as the driver steering mode when the amount of the location control error is maintained at a set value or more for a set time or more.

13. The method of claim 8, wherein the setting of the mode change weight comprises:
setting, by the controller, a maximum mode change weight in an autonomous driving mode, and
setting, by the controller, a minimum mode change weight in the driver steering mode.

14. The method of claim 8, wherein the setting of the mode change weight comprises changing and setting, by the controller, a slope of the mode change weight based on the amount of the location control error or the steering angular velocity when the steering mode is determined as the driver steering mode.

* * * * *